United States Patent Office 3,623,906
Patented Nov. 30, 1971

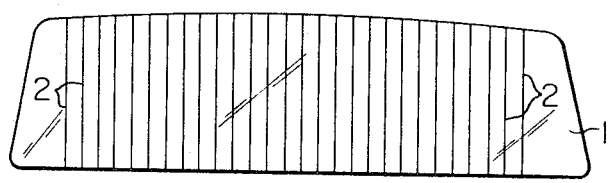
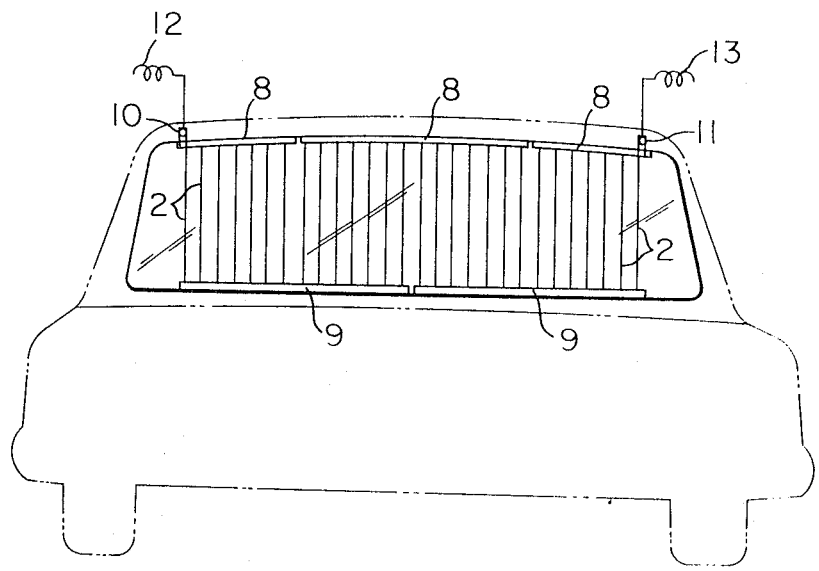

3,623,906
ELECTRICALLY HEATABLE GLASS PRODCT AND
A METHOD FOR THE PRODUCTION THEREOF
Kazuyuki Akeyoshi, Yamato-shi, Kanagawa-ken, and
Naonori Hayashi, Tokyo, Japan, assignors to Asahi
Glass Co., Ltd., Tokyo, Japan
Filed Oct. 21, 1968, Ser. No. 769,044
Claims priority, application Japan, Nov. 9, 1967,
42/71,632
Int. Cl. B44d 1/20; C09j 1/00
U.S. Cl. 117—211                                    13 Claims

ABSTRACT OF THE DISCLOSURE

A glass product which can be electrically heated for removal therefrom, or/and prevention of deposition thereon, of ice, frost and fog, which is suited for use in the window of the vehicle and particularly in the rear window of the automobile. The product consists of a single tempered glass sheet, a plurality of narrow strips of resistance composed of electroconductive frit as fired onto at least one surface of said glass sheet in mutually parallel relation at intervals of about 3 centimeters, and at least a couple of bus bars electrically connected to said strips of resistance. The bus bars are respectively made of a solder which is composed predominantly of $Pb$, $Sn$, $Zn$ and $Sb$, and are directly fired onto said glass surface so that they intersect and connect with the ends of said strips of resistance near the corresponding edges of the glass sheet.

BACKGROUND OF THE INVENTION

This invention relates to glass products which can be electrically heated and a method for their production. More particularly, the invention relates to a glass product which can be electrically heated and can be used as window glass, wherein the surface of the glass is electrically heated to prevent the deposition of water vapor or/and the formation of ice, frost and fog on the surface whereby the intrinsic transparency of the glass is preserved, and a method of producing such glass products which can be electrically heated.

DESCRIPTION OF THE PRIOR ART

Glass products which can be electrically heated are known which respectively consist of a tempered glass sheet and a plurality of strips of resistance composed of an electrically conductive material and disposed on one surface of said glass sheet at intervals of a few centimeters so that the strips of resistance may generate heat as they are electrically energized, thereby preventing the fogging of the surface of said glass sheet.

Glass products of the described type are mostly used in the windows of vehicles and particularly, in the rear windows and windshields of automobiles.

The strips of resistance are fired onto a glass sheet by the operational sequence of applying a paste or susupension of electro-conductive frit in an organic binder by the silk-screen printing technique and, then, firing the printed glass sheet at high temperature.

The term "electro-conductive frit" as used herein means a low-melting glass powder containing a finely divided electrically conductive metal, such as silver. Adjacent to the upper and lower edges, and on the surface of glass sheet are provided a couple of corresponding bus bars or electrodes of relatively large width and low electrical resistance. Those bus bars or electrodes are connected in parallel with the strips of resistance so that the strips may be electrically energized. Terminals are provided on the bus bars for connection with lead wires.

Conventionally, such a bus bar is usually formed in the same manner as said strips of resistance. Thus, electroconductive frit is fired onto glass in the form of strips, and to lower their resistance, the strips are plated with metal, e.g. copper, or a metal plate is welded on.

In such conventional method, a foundation layer for the bus bar is fired on either at the time of firing-on of the strips of resistance or after this operation, and on this foundation layer, a thick plated metal layer or a welded metal sheet is disposed. Thus, the conventional method has the disadvantage of complicated procedure. Moreover, when the surface of a glass sheet is printed with a paste containing an electro-conductive frit by the screen-printing method, it is necessary to simultaneously print the foundation layer for the bus bar as well. Therefore, it is necessary to provide the stencil with the pattern of the resistance strips and of the foundation layer as well. It follows, then, that a stencil so prepared is applicable only to a glass sheet of the particular dimensions. If a change is made in the width of sheet glass, for instance, it becomes necessary to alter the position of the bus bar foundation and, accordingly, provide a new stencil to accommodate the changed position.

Furthermore, since electro-conductive frit is generally very expensive, it is economically unwise to make the bus bar foundations of a large quantity of electroconductive frit, for it is essential, in order to reduce the resistance of the bus bars, that the foundations be constructed in the form of a thick and wide band.

SUMMARY OF THE INVENTION

It is an object of this invention to overcome the aforementioned disadvantages which are inherent in the conventional products and processes.

Another object of this invention is to employ bus bars of a material other than costly electroconductive frit which is used in conventional products.

Still another object is to provide a new production process wherein a screen-printing stencil carrying a given pattern is applicable to glass sheets of different dimensions and which is free from the complexities of the conventional processes. In the present process, neither the bus bar nor the foundation thereof is applied by screen-printing.

Another yet object of the invention is to provide a glass product which can be electrically heated, said product having strips of resistance which are high in abrasion resistance, and a method for the production thereof.

Other objects of the invention will become apparent as the following description proceeds.

In accordance with this invention, there is provided an electrically heatable glass product which consists of a glass sheet, a plurality of narrow strips of resistance fired onto at least one surface of said glass sheet in substantially parallel relation, both ends of each strip of resistance terminating near the edges of the glass sheet, and at least a couple of bus bars, each of which is a solder layer, which is directly fired in band form onto the surface of said glass sheet and intersecting said strips of resistance in the vicinity of said ends thereof.

This invention is also concerned with a method of producing glass products which can be electrically heated, comprising the steps of coating at least one surface of sheet glass with an electroconductive frit-containing paste so as to form a plurality of narrow strips which are disposed in substantially parallel relation on said surface and terminate at or in the vicinity of the edges of said sheet, treating the coated glass sheet at high temperature, whereby said strips are fired onto the glass sheet to yield strips of resistance, and fusing a solder directly onto the surface of said glass sheet to provide at least a couple of bus bars intersecting the strips of resistance.

BRIEF DESCRIPTION OF THE DRAWINGS

FIG. 4 is a diagrammatic plan view of the electrically heatable glass product according to this invention for use in the rear window of an automobile, showing the glass sheet in process; and FIG. 5 is a diagrammatic plan view of the electrically heatable glass product of FIG. 4, showing the glass sheet in finished form.

Figure 1:
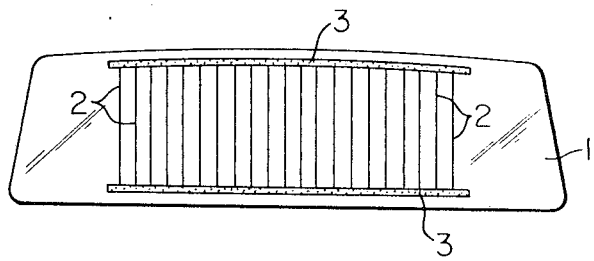
FIG. 1 is a diagrammatic plan view of a conventional electrically heatable glass product for use in the rear window of an automobile, showing the glass sheet in process.

DETAILED DESCRIPTION OF THE INVENTION, AND DESCRIPTION OF THE PREFERRED EMBODIMENTS

This invention is carried into practice, first, by coating one surface of a glass sheet cut to predetermined dimensions with an electroconductive frit-containing paste by conventional screen printing in accordance with a predetermined pattern.

The electroconductive frit mentioned above consists of finely divided electrically conductive metal, e.g. silver, gold, copper, palladium or platinum, and low melting powdered glass which is generally lead borate, lead borosilicate, or lead zinc borate glass. The electroconductive frit is mixed with a vehicle or organic binder selected from among methyl, ethyl, propyl, butyl and higher alcohols; the corresponding esters such as acetates, propionates, etc.; terpenes and liquid resins such as pine oil, to name but a few examples. Such pastes are commercially available in liquid form. In one embodiment of the present invention, use was made of a silver paste, whose non-volatile component contains, by weight, 90% of Ag, 7.3% of PbO, 0.7% of $SiO_2$, 0.7% of $Al_2O_3$ and 1.3% of $B_2O_3$, and which contains about 10% of vehicle or volatile component.

Electroconductive frit and pastes containing such frit are described in U.S. Patents No. 2,924,540 and No. 3,052,573.

In the silk-screen printing process, the paste is placed on a stencil which is a silk screen carrying a predetermined pattern, and the portions of the paste corresponding to the pattern are forced out in accordance with the movement of a squeegee onto the surface of the substrate glass.

After the printing is complete, the printed glass is heated at about 100° C. for a few minutes, whereby the strips of paste are dried. The glass sheet is then transferred to a firing process.

In the firing process, the glass sheet is heated at a temperature which is generally above the annealing point of the glass and below the softening point thereof, and preferably between about 600° and 750° C., whereby the electroconductive frit is fused onto the glass. It is possible, during this heating and/or immediately thereafter, to bend the glass sheet or strengthen it by quenching. Particularly in the production of sheet glass for use in the rear window of an automobile, the firing of the electroconductive frit is preferably conducted simultaneously with the bending and tempering of the glass.

The strips of resistance are generally disposed on sheet glass in a pattern of parallel, straight lines extending in a given direction either lengthwise or crosswise of the glass or, in some instances, diagonally. The strips may also be formed in a wave-like formation or a zig-zag pattern. The distance between any two adjacent strips of resistance is such that the strips will not obstruct the field of view through the glass and the intermediate areas of glass surface defined by those strips are as narrow as will be adequately heated. Thus, the distance is usually about 3 centimeters. The strips of resistance may be disposed all over the sheet glass, or in a confined portion of the surface area. It is preferable that the width of each strip of resistance is as narrow as possible because, then, the strips would present minimum obstructions to visibility through the glass, but in view of the mechanical strength and electric resistance requirements, the strip is usually formed in a width ranging from 0.2 to 1.2 millimeters and, for better results, in the neighborhood of 0.6 millimeter.

In accordance with this invention, the strips of resistance are made to extend to or near the edges of the glass sheet. As will hereinafter be explained, such arrangement eliminates the restriction as to the position of the bus bars to be formed on glass surface across the strips of resistance. Therefore, a single stencil carrying a pattern of sufficiently long strips can be employed for the printing of glass sheets of varied dimensions.

In accordance with this invention, the bus bars which are connected to the ends of the strips of resistance so as to electrically energize the strips are formed as the band-like layers of a solder directly fired onto the glass. The solder is predominantly composed of Pb, Sn, Zn and Sb, and may have the following compositions.

| | Percent |
|---|---|
| Pb | 40–98 |
| Sn | 1.8–50 |
| Zn | 0.05–10 |
| Sb | 0.05–10 |

The following composition is still preferable.

| | |
|---|---|
| Pb | 81–93 |
| Sn | 3–9 |
| Zn | 1.5–6 |
| Sb | 0.5–4 |

The proportional limits for the component elements of the solder are defined for the following reasons. With any solder containing less than 40 percent of Pb and more than 50% of Sn, the solder layer that will be formed on the glass surface tends to be too thin. Conversely, when Pb occurs in excess of 98 percent and Sn occurs in amounts less than 1.8 percent, the bond strength between the solder and glass is low and the soldering operation must be carried out at high temperature. This condition not only leads to an oxidative degradation of the solder which in turn results in poor working quality, but could cause breakage of the glass. A solder containing only less than 0.05 percent of Zn is poor in bond strength, while a solder containing Zn in excess of 10 percent is inferior in ductility and resistance to water. If Sb is present in amounts less than 0.5 percent, the solder is poor in water resistance.

The occurrence of Sb in excess of 10 percent would reduce the ductility of the solder.

In the solder of the above-defined composition, not more than 0.1 percent of aluminum is incorporated. The presence of aluminum prevents the formation of scale due to the oxidation of the solder during the soldering operation. Thus, aluminum is added in amounts from 0.1 to 0.01 percent and, preferably, from 0.05 to 0.02 percent. The bond strength of the solder is low when its aluminum content exceeds 0.1 percent. In addition, one or more members of the group consisting of Si, Ti and Be are incorporated in the solder, the total amount of the members not exceeding 0.5 percent. Those components assist in the prevention of fogging or delustering of the surface of the solder layer fused onto the glass. More specifically, those components are added in a combined amount of 0.02 to 0.5 percent and, preferably, 0.15 to 0.06 percent. If the total exceeds 0.5 percent, the bond strength of the solder is reduced.

Since Si, Ti and Be are so high-melting that it is difficult to add them in metallic form, they are preferably added as alloys with copper or aluminum, e.g. an alloy with the following composition: 76% Cu–24% Ti, 85% Cu–15% Si and 96% Cu–4% Be. In such cases, about 1 to 3 percent of copper will find its way into the solder, but the presence of not exceeding 3 percent of copper does not adversely affect the properties of the solder.

The solder is applied to the surface of the glass by means of a soldering spatula pre-heated to about 300° to 400° C. For this soldering, it is preferable to employ a soldering spatula which is adapted to vibrate in the directions parallel to the glass surface at an ultrasonic frequency and, preferably, at 20 to 30 kilocycles. In this manner, the tip of the soldering spatula applies a frictional force to the glass to improve its surface activity and, accordingly, tends to give an extremely strong bond between the solder layer and glass.

By the soldering operation described above, there is provided near the edge of the glass a bus bar (solder layer) which, for example, is about 1 centimeter wide and about 0.5 millimeter thick. The bus bar is provided with a terminal, which in turn is connected to a lead wire leading to a power supply so that the current may flow from the terminal to the bus bar and the strips of resistance which have hereinbefore been described.

The electrically heatable glass product obtained according to the process described is usually employed as window glass. For this reason, it is important that the strips of resistance have a high degree of abrasion resistance. Cleaning of the glass with a liquid glass cleaner containing solid particles damages the strips of resistance and increase the resistance.

In accordance with the invention, a thin synthetic resin film may be formed on the strip of resistance by electrophoretic deposition so that the abrasion resistance of the strip may be considerably increased.

The electrophoretic deposition method referred to above is a coating method which utilizes the theory of electrophoresis, that is to say, the phenomenone that when a direct current is impressed between a couple of electrodes immersed in a suitable suspension, the suspended particles migrate to one of the electrodes where they are deposited. When this coating method is applied to the coating of the strips of resistance on the electrically heatable glass product of this invention, an abrasion-resistant, electrically insulating film can be selectively formed only on the strip of resistance fired onto the glass surface.

In this coating operation, the glass sheet is immersed in a suspension of resin particles, e.g. acrylic resin, alkyd resin or polyester resin particles, and with the strips of resistance serving as an anode, a cathode plate is placed in juxtaposition therewith. In this arrangement, a direct current of about 150 to 250 volts is applied, whereupon the suspended particles are negatively charged and migrate toward the anode, i.e. the strips of resistance, where they are deposited. This treatment is complete within 5 minutes.

The glass sheet is then raised out of the bath and washed with water, whereby the resin adhering to the portions of the glass surface other than the strips of resistance is removed.

Finally, a curing operation is carried out. In this operation, the glass sheet is held at 170° to 250° C. for 10 to 30 minutes, whereupon the water and gas contained in the deposited film are removed.

The thickness of the film is about 10 to 100μ and preferably, 20 and 40μ.

Figure 2:
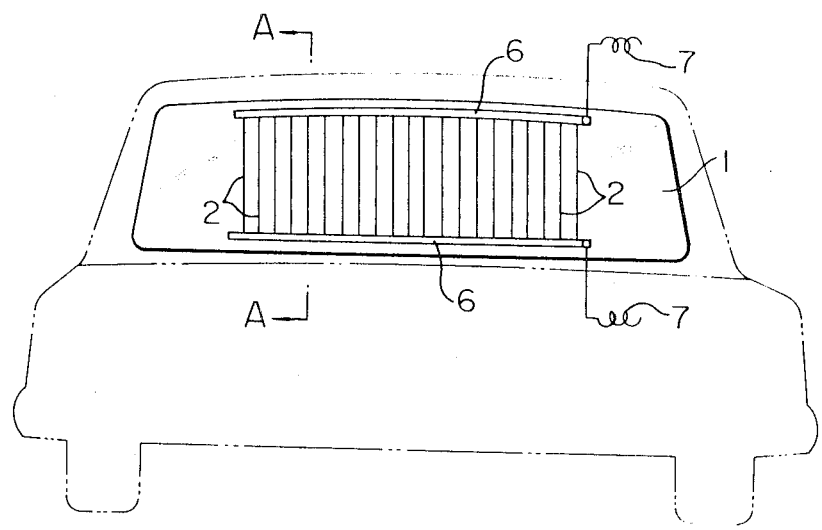
FIG. 2 is a diagrammatic plan view of the electrically heatable glass product of FIG. 1, showing the glass product in finished state.
Figure 3:
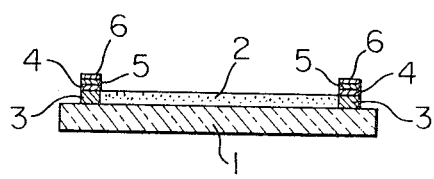
FIG. 3 is an elementary view, on exaggerated scale, taken along the line A—A of FIG. 2.

With reference to FIGS. 1, 2 and 3, the conventional electrically heatable glass product and the production process therefor will hereinafter be described.

Indicated by reference numeral 1 is a glass sheet to be fitted in the rear window of an automobile. There are provided, on the surface of said glass sheet, a plurality of strips of resistance 2, each of which is an electroconductive frit as fired onto said sheet 1 along the longitudinal axis of the sheet and in mutually parallel relation. As is shown in FIG. 1, a pair of bus bar foundation layers 3 are formed, said layers 3 consisting in an electroconductive frit, simultaneously when said strips of resistance 2 are formed.

Each of the foundation layer 3 is disposed near one edge of the glass sheet and intersects the ends of said strips of resistance. Those foundation layers are printed together with said plurality of strips of resisance 2, followed by drying and firing.

As shown in FIGS. 2 and 3, a copper plating layer 4 is formed on the foundation layer 3 and a metal plate 6 is further soldered onto the copper plating layer 4. Reference numeral 5 shows the solder layer. The metal plate 6 is provided with a lead wire which is connected to an external power supply.

In the conventional product described and illustrated, there need be a foundation layer for the bus bar. Therefore, as the size of the glass sheet is altered, both the lengths of the strips of resistance and the position of the bus bar must accordingly be changed.

It follows, then, that it becomes necessary to provide several stencils carrying different patterns. In addition, to obtain a complete bus bar, some additional process is required.

In the electrically heatable glass product according to this invention, which is to be described with reference to FIGS. 4 and 5, the foregoing disadvantages are overcome.

As shown in FIG. 4, there are provided, on the surface of a glass sheet, a plurality of strips of resistance, each of which extends along the longitudinal axis of said glass sheet and terminates at the edges of the sheet, in mutually parallel relation.

The glass sheet 1, which is to be fitted in the rear window of an automobile, is a tempered glass sheet having curved surfaces, about 35 centimeters in width and about 100 centimeters in length. The strips of resistance are formed in the following manner. Thus, use is made of a commercial silver paste for screen printing, the nonvolatile component of which has approximately the following composition:

|   | Percent |
|---|---|
| Ag | 90 |
| PbO | 7.3 |
| $B_2O_3$ | 1.3 |
| $SiO_2$ | 0.7 |
| $Al_2O_3$ | 0.7 |

By the silk-screen printing method, a total of 28 strips, 0.6 millimeter wide each, are printed at intervals of 3 centimeters, said strips extending to the corresponding edges of the glass sheet. The printed glass sheet is heated at about 100° C. for 5 minutes so that the strips are dried. Then, the sheet is heat-treated in a heating furnace at 700° C. for 4 minutes, whereby the strips are fired onto the glass surface. In this heating process, the glass sheet is positioned on a skeleton-type bending mould, where it is bent under the influence of gravity. The printed glass is then tempered by quenching.

Then, as shown in FIG. 5, a pair of bus bars 8 and 9, in the form of band-like solder layers, are fused onto the glass sheet in such a manner that the bars intersect the strips of resistance 2 along the edges of the glass sheet 1. The solder used in this process has the following composition:

|   | Percent |
|---|---|
| Pb | 66.3 |
| Sn | 28.4 |
| Zn | 2.8 |
| Sb | 1.9 |
| Al | 0.05 |
| Ti | 0.05 |
| Si | 0.1 |
| Cu | 0.4 |

This soldering operation is performed by means of a soldering spatula designed so that its tip vibrates in a horizontal plane at a frequency of 20 kilocycles and in a total amplitude of 30µ. The tip of the soldering spatula is held at the temperature of about 350° C. The tip dips itself into a solder melt and applies the solder while rubbing against the surface of the glass sheet. As it is possible to sever the bus bar being formed into separate portions by raising the soldering spatula out of contact with the surface, it is optional to alter the mode of connection between the bus bar and strips of resistance.

Each of the bus bars 8 and 9 is about 10 millimeters wide and about 0.4 millimeter thick.

As shown, in order to obtain four sets of circuitry, each of which consists of seven strips of resistance connected to the bus bars in parallel, the upper bus bar 8 on the glass sheet is divided into three separate lengths and the lower bus bar 9 into two separate lengths. The upper bus bar 8 is provided, at both ends, with connecting terminals 10 and 11 which are connected to lead wires 12 and 13, respectively. The lead wires 12 and 13, in turn, are connected to a power supply (not shown). Generally, the bus bars are concealed through gaskets behind the sash.

In the foregoing embodiment, the electric resistance per strip of resistance is about 2.15 ohms, and the total resistance of the circuit inclusive of the bus bars is about 1.44 ohms. When the circuit is connected to a 12-volt power supply, there flows a current of about 8.3 amperes and an electric power of 100 watts is applied to the glass surface.

A test on the anti-fogging performance of the glass sheet is carried out under the above electrical conditions. The glass sheet is fitted in an opening formed in one wall of a box, 150 by 150 by 80 centimeters, and the box is hermetically sealed. The temperature within the box is held at 24° C., and the external temperature at 10° C. Then, water vapor is generated within the box so that dews are formed on the inside surface of the glass. About 5 minutes after the formation of dew, the circuit on the glass is energized, whereby the glass is heated. The disappearance of the dew is visually inspected and the temperature readings are taken in the center of the glass sheet at timed intervals.

After the energization of the circuit starts, the portions of the glass sheet along the strips of resistance are first dried. The dry areas so formed gradually expand and in about 10 to 12 minutes, the entire surface of the glass is completely dried. The changes in width of the dry band on the inside surface of the glass with the passage of time is represented in Table 1, which also shows the changes in temperature of the central area of the glass sheet.

The width of the dry band means an average width of the dry areas which expand on both sides of the respective strips of resistance with the passage of time.

TABLE 1

| Time (minutes) | Temperature of the inside surface of glass (° C.) | Width of dry band (mm.) |
| --- | --- | --- |
| 0 | 18.0 | 0 |
| 2 | 19.5 | 4.5 |
| 4 | 21.5 | 8.0 |
| 6 | 23.0 | 12.0 |
| 8 | 24.0 | 18.0 |
| 10 | 25.0 | 30.0 |

The result of an electrical durability test on the above electrically heatable glass product is as follows. Thus, a direct current of about 13 amperes (about 19 volts) is applied to the circuit for 15 minutes, and the application of the current is suspended for 15 minutes. This make-and-break procedure is repeated 50 times. The result shows that both the bus bars and strips of resistance remain entirely unaffected.

In order that the strips of resistance fired onto a glass sheet may generate more heat in a desired portion of the glass surface than in the rest of the surface, it is possible to arranged so that the electric resistance of the strips located within said desired portion will be higher than the resistance in the remainder of the surface. For this purpose, an electrically conductive metal such as copper or silver may be deposited on the surfaces of the strips of resistance located outside said desired portion by the conventional galvanizing technique.

As an alternative, it is possible to diminish the thickness or/and width of the strips of resistance within said desired area. If desired, it is also possible to make the strips of resistance within said area of a different electroconductive frit which has a higher electric resistance.

The solder to be used in the formation of the bus bar may have other compositions.

Some of such alternative solder compositions are shown in Table 2.

TABLE 2

| | Composition (weight percent) | | | | | | | |
| --- | --- | --- | --- | --- | --- | --- | --- | --- |
| | Pb | Sn | Zn | Sb | Al | Si | Ti | Be | Cu |
| Number: | | | | | | | | | |
| 1 | 81 | 9 | 6 | 4 | | | | | |
| 2 | 81 | 9 | 6 | 4 | 0.02 | | | | |
| 3 | 81 | 9 | 6 | 4 | 0.05 | 0.05 | | | |
| 4 | 93 | 4 | 2 | 1 | | | | | |
| 5 | 93 | 4 | 2 | 1 | 0.02 | 0.05 | 0.05 | 0.05 | |
| 6 | 95 | 3 | 1.5 | 0.5 | | | | 0.05 | |
| 7 | 70 | 24 | 2 | 1.5 | 0.01 | 0.05 | 0.05 | 0.05 | 2.57 |

Any of those solders may be directly fused on glass surface at the bond strength of about 70 kg./cm.$^2$ or higher.

The following description deals with a typical instance in which a protective synthetic resin coating is applied to the strips of resistance by electrophoretic deposition.

An iron-made tank lined with polyvinyl chloride resin, 200 cm. long, 100 cm. wide and 100 cm. deep, is filled with a coating material of the following composition.

| | Wt. percent |
| --- | --- |
| Acrylic resin | 15 |
| Organic solvent | 5 |
| Water | 80 |

This paint is such that the COOH groups contained in the acrylic resin are substantially neutralized by $NH_4$ groups so that on application of a direct-current field, the suspended particles will be negatively charged.

In the tank is disposed a cathode plate of stainless steel. The glass sheet to be treated is immersed in the paint in juxtaposition with the cathode plate, and so that the strips of resistance will function as anodes, the bus bar terminal is connected to the plus (+) side of the power supply (200 volts), while the cathode plate is connected to the minus (−) side of the power supply.

Deposition of the paint begins as soon as the electrophoretic circuit is energized, and the acrylic resin is evenly deposited on the surfaces of said strips of resistance.

The application of the electric field is suspended after two minutes. The coated glass sheet is taken out of the tank and sprayed with water so that the paint adhering to the portions other than the strips of resistance is removed.

The glass sheet is then fed into a heating furnace held at 180° C., where it stayed for 30 minutes. The glass sheet taken out from the furnace is allowed to cool at room temperature.

During this treatment, the water and gases trapped in the resin deposited on the strips of resistance are dispelled out so that the resin is cured. The cured thickness of the resulting film is about 30µ.

In an abrasion resistance test, the strips of resistance on the glass are rubbed against with a cloth impregnated with a liquid glass cleaner containing solid particles, and the increases in electric resistance of the strips are measured at timed intervals. For comparison, a similar test is carried out on an uncoated glass sheet.

The results are summarized in Table 3.

TABLE 3

| Rubbing time, minutes | Increase in electric resistance | |
|---|---|---|
| | Uncoated glass sheet, percent | Coated glass sheet, percent |
| 0 | 0 | 0 |
| 30 | 20 | 0 |
| 60 | 55 | 0 |
| 90 | 110 | 0 |
| 120 | 465 | 10 |

It is found that the strips of resistance which have been coated by electrophoretic deposition have an unusually high abrasion resistance.

We claim:

1. In an electrically heatable glass product comprising a single glass sheet, a plurality of strips of resistance formed by firing an electroconductive frit onto at least one surface of said glass sheet, said strips of resistance being disposed in mutually substantially parallel relation and extending toward and terminating substantially at the edges of said glass sheet, and at least a couple of bus bars, each of which is formed on the glass surface in such a manner that it intersects the strips of resistance near the ends of said strips so as to electrically energize said strips of resistance, said bus bars consisting essentially of Pb, Sn, Zn and Sb.

2. An electrically heatable glass product according to claim 1, wherein said solder is predominantly composed of, by weight, 40 to 98 percent of P$b$, 1.8 to 50 percent of S$n$, 0.05 to 10 percent of Z$n$ and 0.05 to 10 percent of S$b$.

3. An electrically heatable glass product according to claim 1, wherein said solder is composed predominantly of, by weight, 40 to 98 percent of P$b$, 1.8 to 50 percent of S$n$, 0.05 to 10 percent of Z$n$, 0.05 to 10 percent of S$b$ and not more than 0.1 percent A$l$.

4. An electrically heatable glass product according to claim 1, wherein said solder is composed predominantly of, by weight, 40 to 98 percent of P$b$, 1.8 to 50 percent of S$n$, 0.05 to 10 percent of Z$n$, 0.05 to 10 percent of S$b$, not more than 0.1 percent of A$l$, and at least a member selected from the group consisting of S$i$, T$i$ and B$e$, the combined total amount of the members being not more than 0.5 percent.

5. An electrically heatable glass product according to claim 4, wherein said solder further contains not more than 3 percent of C$u$.

6. An electrically heatable glass product according to claim 1, wherein each of said strips of resistance has a thin protective synthetic resin film as formed by electrophoretic deposition.

7. In the method of producing an electrically heatable glass product which comprises the steps of coating at least one surface of sheet glass with an electroconductive frit by the screen printing technique in such a manner that a plurality of narrow strips of said frit is formed on said surface in mutually substantially parallel relation, said strips extending toward and terminating near the edges of said glass sheet, firing the coated strips at a high temperature so as to obtain strips of resistance on the surface and forming at least a couple of bus bars on said surface which intersect and connect with said strips of resistance, the improvement thereof wherein said bus bars are formed by fusing a solder directly onto the glass surface in the form of bands.

8. A method according to claim 77, wherein said bus bars are formed by fusing said solder directly on the glass surface with the aid of a soldering spatula adapted to vibrate at an ultrasonic frequency.

9. A method according to claim 7, wherein said solder is composed predominantly of, by weight, 40 to 98 percent of P$b$, 1.8 to 50 percent of S$n$, 0.05 to 10 percent of Z$n$ and 0.05 to 10 percent of S$b$.

10. A method according to claim 7, wherein said solder is composed predominantly of, by weight, 40 to 98 percent of P$b$, 1.8 to 50 percent of S$n$, 0.05 to 10 percent of Z$n$, 0.05 to 10 percent of S$b$ and not more than 0.1 percent of A$l$.

11. A method according to claim 9, wherein said solder additionally contains at least one member of the group consisting of S$i$, T$i$, and B$e$, the combined amount of which being not more than 0.5 percent.

12. A method according to claim 11, wherein the solder further contains not more than 3 percent by weight of C$u$.

13. A method according to claim 7, wherein the improvement additionally comprises the step of applying a thin synthetic resin film to the surface of said strips of resistance by electrophoretic deposition.

References Cited

UNITED STATES PATENTS

| 2,710,900 | 6/1955 | Linder | 117—211 X |
| 2,557,983 | 6/1951 | Linder | 117—211 X |

WILLIAM L. JARVIS, Primary Examiner

U.S. Cl. X.R.

117—212, 131, Dig. 1; 204—181